United States Patent
Takano

(10) Patent No.: US 7,061,717 B2
(45) Date of Patent: Jun. 13, 2006

(54) YOKE STRUCTURE WITH CONSTRICTED WIDTH

(75) Inventor: Kenichi Takano, Cupertino, CA (US)

(73) Assignee: Headway Technologies, Inc., Milpitas, CA (US)

( * ) Notice: Subject to any disclaimer, the term of this patent is extended or adjusted under 35 U.S.C. 154(b) by 336 days.

(21) Appl. No.: 10/443,362

(22) Filed: May 22, 2003

(65) Prior Publication Data
US 2004/0233577 A1 Nov. 25, 2004

(51) Int. Cl.
G11B 5/127 (2006.01)
(52) U.S. Cl. .................. 360/126; 360/125; 360/122
(58) Field of Classification Search .............. 360/125, 360/126, 122
See application file for complete search history.

(56) References Cited

U.S. PATENT DOCUMENTS

| | | | | |
|---|---|---|---|---|
| 5,600,519 | A * | 2/1997 | Heim et al. | 360/126 |
| 6,288,871 | B1 | 9/2001 | Tanabe | 360/126 |
| 6,327,116 | B1 * | 12/2001 | Watanabe et al. | 360/126 |
| 6,339,523 | B1 | 1/2002 | Santini | 360/317 |
| 6,441,995 | B1 * | 8/2002 | Sasaki | 360/126 |
| 6,473,276 | B1 | 10/2002 | Chang et al. | 360/317 |
| 6,493,191 | B1 | 12/2002 | Cain et al. | 360/246.2 |
| 6,525,904 | B1 * | 2/2003 | Sasaki | 360/126 |
| 6,621,659 | B1 * | 9/2003 | Shukh et al. | 360/126 |
| 6,624,971 | B1 * | 9/2003 | Sasaki | 360/126 |
| 6,742,241 | B1 * | 6/2004 | Sasaki | 29/603.07 |
| 6,826,012 | B1 * | 11/2004 | Sasaki | 360/126 |
| 2001/0043434 | A1 * | 11/2001 | Urai et al. | 360/126 |
| 2002/0093763 | A1 * | 7/2002 | Sato et al. | 360/126 |
| 2003/0112555 | A1 * | 6/2003 | Sato et al. | 360/126 |
| 2003/0151851 | A1 * | 8/2003 | Sato et al. | 360/126 |

* cited by examiner

Primary Examiner—William J Klimowicz
(74) Attorney, Agent, or Firm—Saile Ackerman LLC; Stephen B. Ackerman

(57) ABSTRACT

In current high density magnetic memory systems a large write current is used, giving its waveform a large overshoot. This often brings about severe excess saturation of the media so the recorded transition quality degrades. This problem has been overcome by constricting a portion of the write head yoke. This effectively places a flux control valve ahead of the write pole tip which reduces the sensitivity of the write field to the write current as well as to other parameters, thereby enabling the write field to rise very rapidly without an excessive increase in the write width and reducing its sensitivity to the write current at low current values.

14 Claims, 4 Drawing Sheets

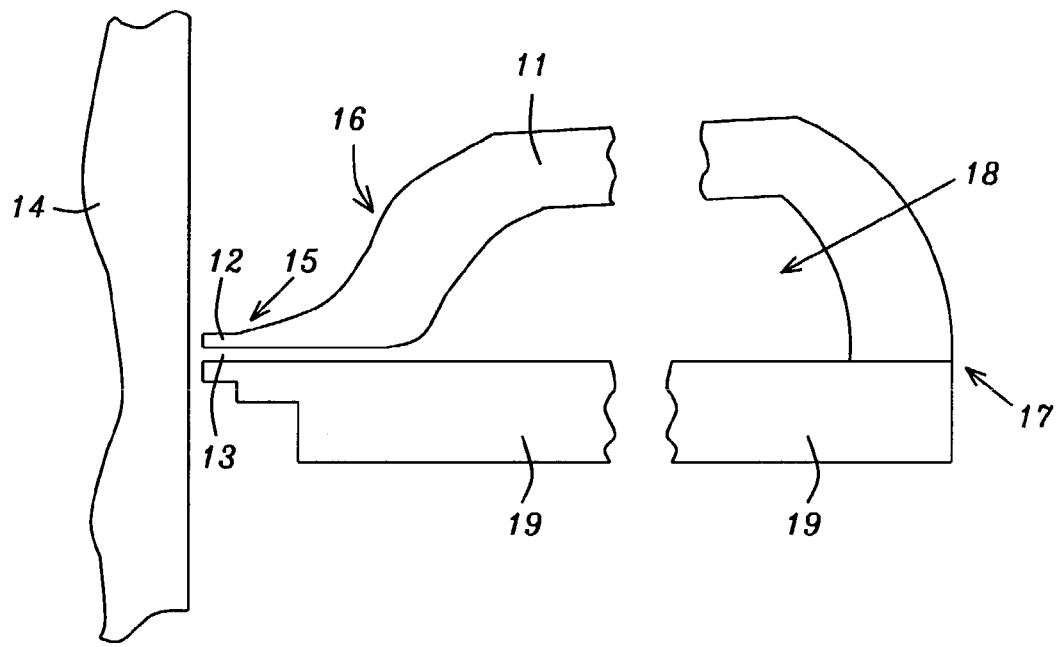
FIG. 1a – Prior Art
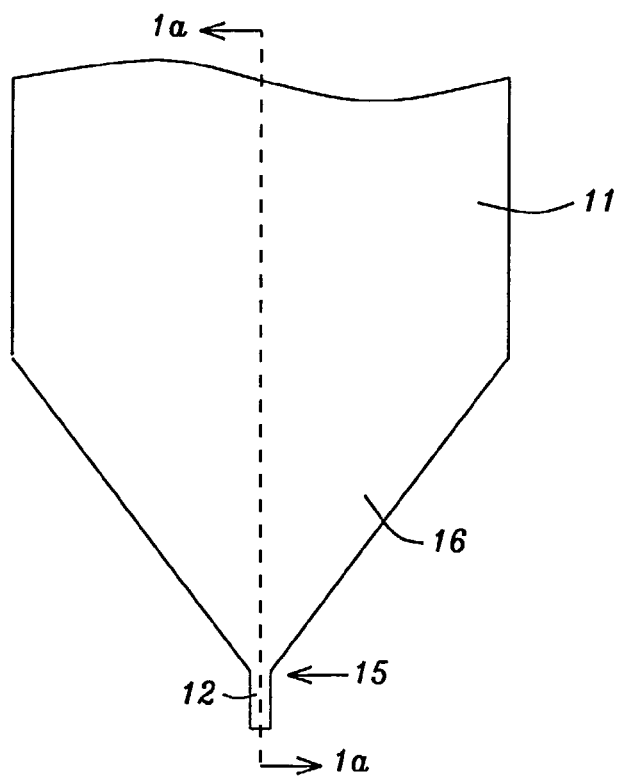
FIG. 1b – Prior Art

YOKE STRUCTURE WITH CONSTRICTED WIDTH

FIELD OF THE INVENTION

The invention relates to the general field of magnetic disk systems with particular reference to improved write head designs

BACKGROUND OF THE INVENTION

In FIG. 1a we show, in schematic cross-section, a typical magnetic write head of the prior art. It is made up of lower pole 19 (P1) which is connected to upper pole P2, on one end at back-gap 17 and at the other end through write gap 13. A write coil (not shown) is located within chamber 18. When the write coil is energized by passing a write current through it, a magnetic field is generated, the flux from this field being constrained to lie almost entirely inside P1 and P2. The only exception is at gap 13 across which the full flux passes. Fringe fields from the flux passing across gap 13 extend out as far as recording media 14 and interact with it. P2 is made up of yoke 11 which terminates at pole tip 12.

FIG. 1b is a plan view of the left hand portion of FIG. 1a, making FIG. 1a a cross-section of FIG. 1b taken through 1a—1a. As can be seen, the yoke starts out relatively wide where it is well removed from pole tip 12 and, as it approaches the latter, its width is gradually and uniformly reduced until flare point 15 is reached where the width stays constant, defining the area covered by the write pole and thus the width of the write field at the surface of the media.

To be able to accommodate increases in the recording density, media coercivity must be increased to overcome the demagnetization field of the magnetic transition. However, as the track width decreases, the head field strength tends to decrease due to saturation of the pole tip. Unfortunately, a high-end hard disk drive (HDD) generates such a high data rate transfer that not only is greater head field strength required, but there also is a need for a faster flux rise time.

So as to attain a large enough overwrite (OW) value, the write current is boosted, giving its waveform a large overshoot. This often brings about severe excess saturation of the media, and the recorded transition quality degrades. As a result of this readback pulse width broadening, nonlinear transition shifts, media noise increases, and adjacent track erasures often occur.

A routine search of the prior art was performed with the following references of interest being found:

In U.S. Pat. No. 6,493,191, Gain et al. describe a recording head where the dimensions of the yoke are designed to avoid saturation at the pole tips during writing. U.S. Pat. No. 6,473,276 (Chang et al.) discloses a notch at the flare point of the yoke. U.S. Pat. No. 6,339,523 (Santini) shows a flare point close to the air bearing surface of the write head while, in U.S. Pat. No. 6,288,871, Tanabe shows the width of the yoke shorter than the magnetic gap width

SUMMARY OF THE INVENTION

It has been an object of at least one embodiment of the present invention to provide a magnetic write head that has a faster field rise with write current.

Another object of at least one embodiment of the present invention has been to reduce the spread in track width that is associated with large write currents.

Still another object of at least one embodiment of the present invention has been to reduce the sensitivity of the head field to the write current at higher currents.

A further object of at least one embodiment of the present invention has been to provide less unintended adjacent track erasure during data writing.

Yet a further object of at least one embodiment of the present invention has been to provide a method for achieving the above objects.

These objects have been realized by constricting a portion of the write head yoke. This effectively places a flux control valve ahead of the write pole tip which reduces the sensitivity of the write field to the write current as well as to other parameters, thereby enabling the write field to rise very rapidly without an excessive increase in the write width and reducing its sensitivity to the write current at low current values. Data demonstrating the effectiveness of this approach is also presented.

BRIEF DESCRIPTION OF THE DRAWINGS

FIGS. 1a and 1b show two views of a write head of the prior art.

DESCRIPTION OF THE PREFERRED EMBODIMENTS

As noted above, a key objective of the present invention is to achieve a faster head field rise at low write currents while making the head field strength and distribution less sensitive to high write currents. This is achieved by constricting a portion of the yoke structure. This constricted section works as a flux control valve to pole tip 12, which reduces the sensitivity of the head field to the write current and other parameter variations. As the write current increases, the first saturation occurs at the flare point 15 where constriction of the yoke begins. The constricted section 16 is designed to be saturated at slightly larger write current than this flare point. Consequently the constricted width controls the flux supply to the pole tip region when in high current mode and suppresses readback pulse width broadening, nonlinear transition shifts, media noise increases, and adjacent track erasures.

Figure 2:
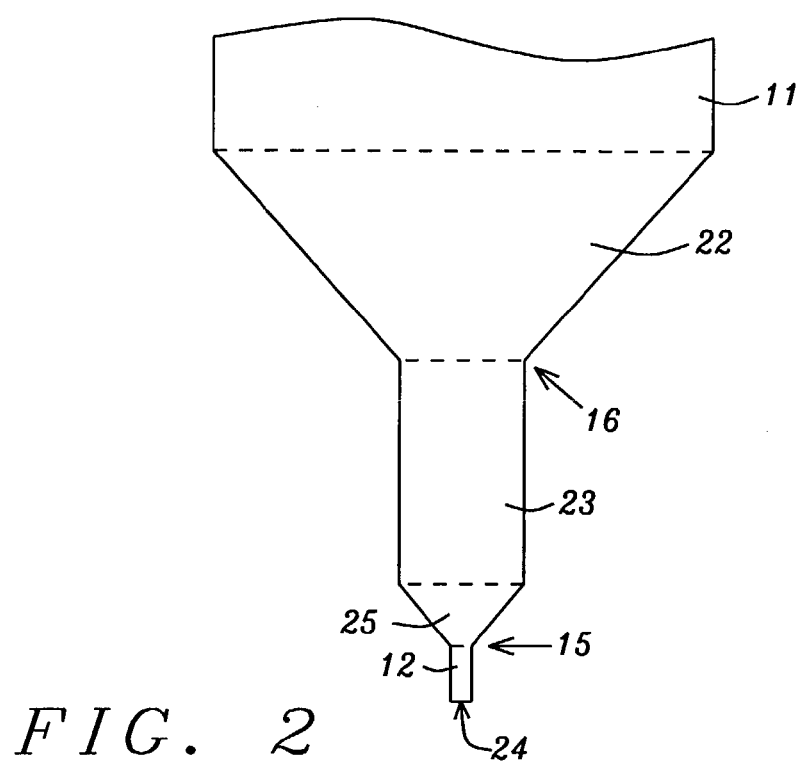
FIGS. 2 and 3 are plan views of two embodiments of the present invention.

Referring now to FIG. 2, we show there a first embodiment of the portion of the yoke that terminates at the write pole. A plan view similar to that seen for FIG. 1b is presented and it can be seen that this part of the yoke is made up of several parts, all of which are seamlessly connected to form a continuous whole:

The first of these is marked as 11 in FIG. 2 and it extends all the way back to the connection with lower pole P1 (marked as 17 in FIG. 1a). Extending downwards and away from 11 is trapezoid 22 that is between about 2 and 6 microns high and that extends as far as first flare point 16. The common boundary between 11 and 22 is a straight edge between about 6 and 13 microns wide.

The part that follows is rectangle 23 which is the constricted section that forms the heart of the invention. Its width is between about 1.6 and 5 microns with its length being between about 1 and 6 microns. Rectangle 23, in turn, connects to write pole tip 12, through trapezoid 25, whose height is between about 0.5 and 2 microns, meeting it at second flare point 15 where the width of the structure is between about 0.15 and 0.3 microns. The width of pole tip 12 now remains constant at this value all the way to its physical edge 24.

Figure 3:
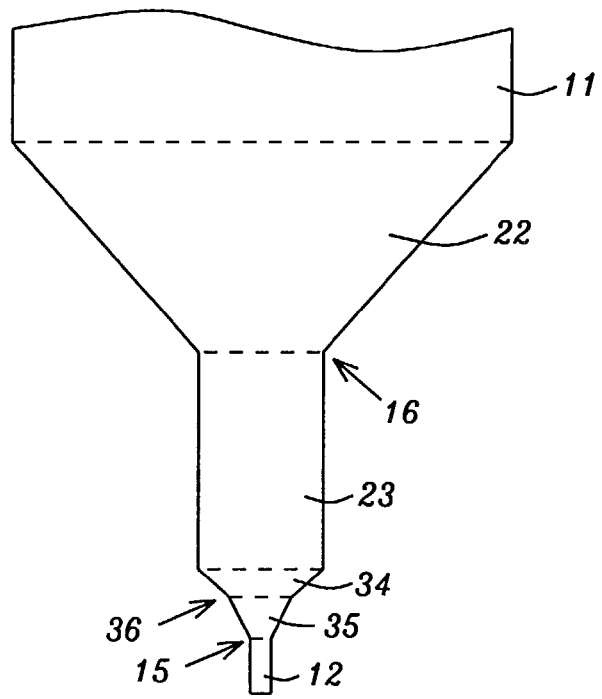

A second embodiment is illustrated in FIG. 3. It is similar to the first embodiment described above except that there are two trapezoidal parts, 34 and 35, separating constricted section 23 from pole tip 12. The width at flare point 34 is between about 1.6 and 5 microns and at flare point 36 it is between about 0.4 and 2 microns. The height of trapezoid 34 is between about 0.5 and 2 microns while that of trapezoid 35 is between about 0.5 and 2 microns. The presence of the additional trapezoid part results in the presence of an additional flare point 36. This has the advantage over the first embodiment of reduced head field sensitivity to increases in write current.

Relative to the prior art, either of the embodiments disclosed above offers, amongst others, the following advantages:

1. Track width spreads associated with large write currents are reduced.
2. There is less sensitivity of the head field to the write current.
3. A faster head field rise is obtained at low write currents.
4. There is less adjacent track erasure

CONFIRMATORY RESULTS

Figure 4:
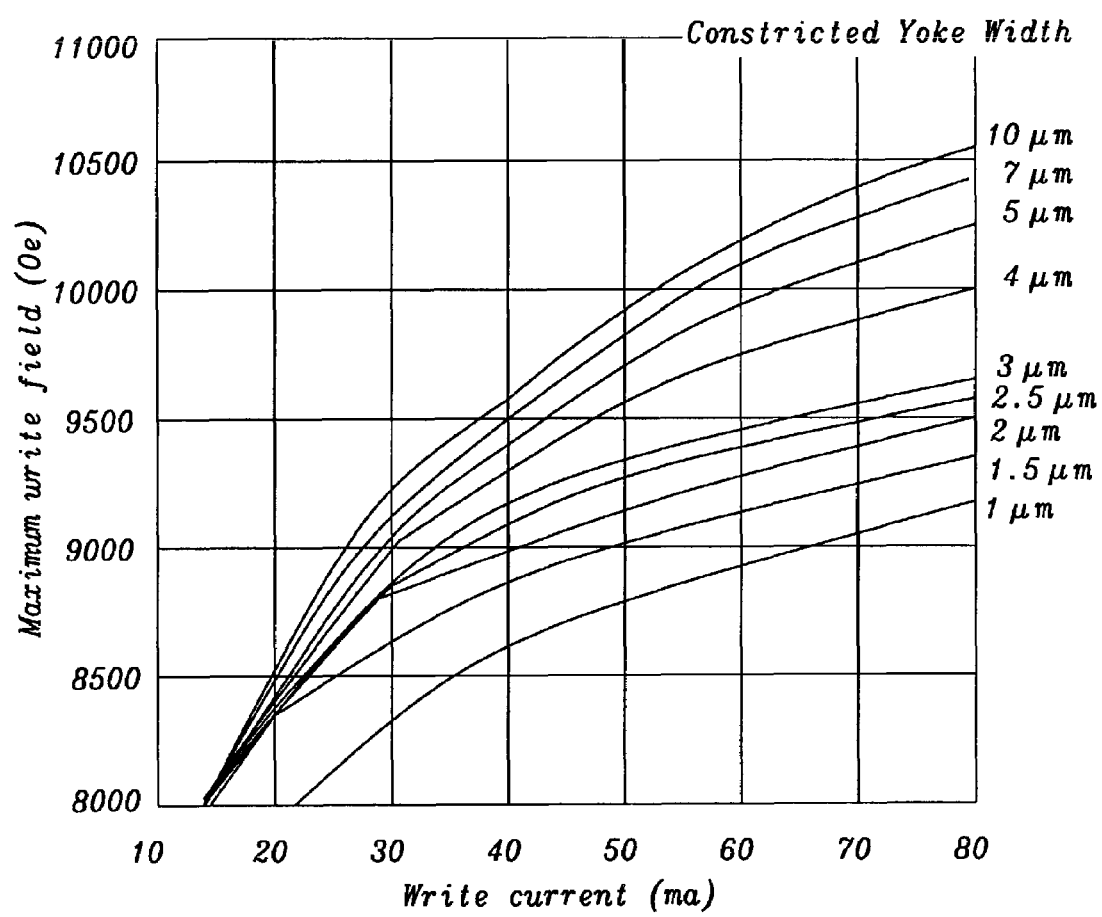
FIG. 4 plots the maximum write field as a function of write current for a range of constricted yoke widths.

FIG. 4 is a plot of maximum write field as a function of write current for a range of widths (1–10 microns) of the constricted portion of the yoke. The width of the write pole tip was 0.20 microns. While all plots show a write field increase with increasing write current, it is apparent that the precise form of each plot depends on the associated constricted width. In particular, for constriction widths of 4 microns or less, the sensitivity is reduced. On the other hand there is a severe field decrease for low write currents for constriction widths of 1.5 microns or less, even in the low current region of less than 30 mA. At 20 mA write current, the 1 micron wide constriction has a reduced head field of 400 Oe. At 30 mA, the 1.5 and 1 micron widths show a field decrease of 150–400 Oe. A 100 Oe head field drop corresponds to a 0.7 dB loss of overwrite. So, for currents below 30 mA, constriction widths of 1.5 microns or less undergo a severe field decrease.

Figure 5:
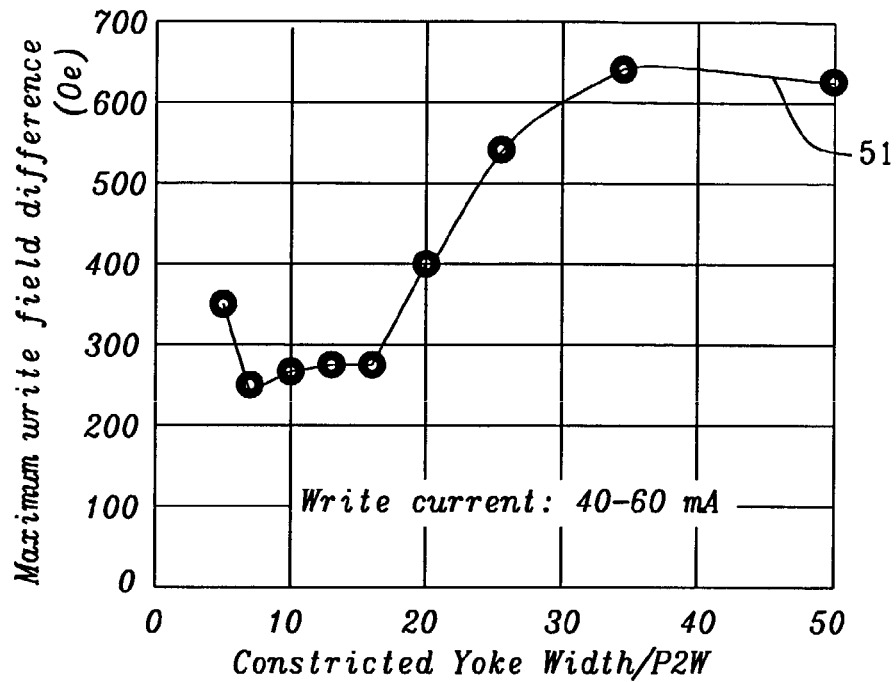
FIG. 5 is a plot of the maximum change in write field strength as a function of the normalized constricted yoke width.

In FIG. 5, the change in write field strength between 40 and 60 mA is plotted (curve 51) as a function of the normalized constriction width (actual constriction width divided by P2W, the track width). It can be seen that for normalized constriction widths of about 20 or less, there is little change in write width for write currents between 40–60 mA. However, when the normalized constriction width is less than about 8, the field strength itself degrades. So the optimum constriction width is between about 8×P2W and 20×P2W Similar data may be generated for the second embodiment which is the 2-angle yoke tip, shown in FIG. 3. For this case it is found that the optimum constriction width lies in the range of between about 3 and 10×$2^{nd}$ Flare Width (at 36 in FIG. 3).

Figure 6:
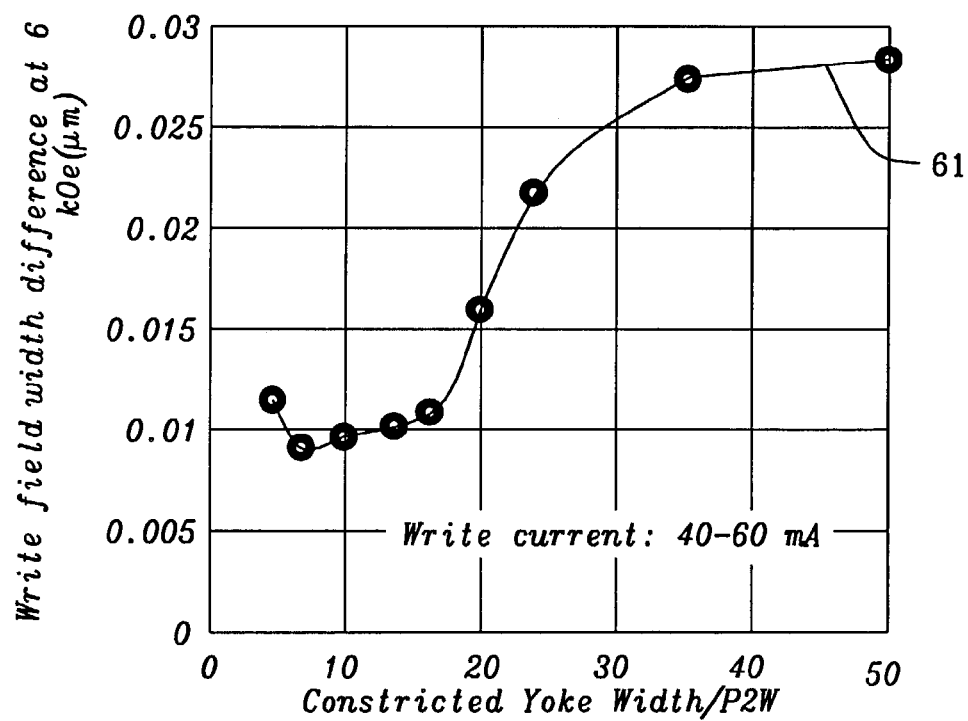
FIG. 6 is a plot of the maximum change in write field width as a function of the normalized constricted yoke width.

In FIG. 6, the change in write field width (defined as region within which write field is 6 kOe or more) between 40 and 60 mA is plotted (curve 61) as a function of the normalized constriction width. The optimum value (where there is the least sensitivity to the write current) is the same as that seen in FIG. 5. Thus, since this constricted yoke design has less fringing field for the track width direction, it can provide stable magnetic write width definition and good adjacent track erasure.

We conclude by noting that the magnetic properties of thin films are known to be very sensitive to a number of factors in addition to their composition. Said factors include, but may not be limited to, thickness, deposition conditions, annealing treatments (particularly in the presence of a magnetic field), immediate underlayer, and immediate overcoating. Thus, as a general rule, the parameters that characterize the layers named in the claims to be recited below should be regarded as critical rather than merely optimal.

While the invention has been particularly shown and described with reference to the preferred embodiments described above, it will be understood by those skilled in the art that various changes in form and details may be made without departing from the spirit and scope of the invention.

What is claimed is:

1. A yoke for a magnetic write head, comprising:
    a main section, having a first width, that is connected to a back-gap;
    a pole tip, having a second width, for writing magnetic data;
    a constricted region, having a width intermediate between said first and second widths, that connects said main section to said pole tip, acting thereby as a flux control valve; and
    wherein the ratio of said constricted region's width to said pole tip's width is between 8 and 20 whereby there is a write field increase of less than 0.4 kOe for a write current increase from 40 to 60 mA.
2. The yoke described in claim 1 wherein said first width is between about 6 and 13 microns.
3. The yoke described in claim 1 wherein said second width is between about 0.15 and 0.3 microns.
4. The yoke described in claim 1 wherein said constricted region is between about 1 and 6 microns long.
5. The yoke described in claim 1 wherein its width at said constricted region reduces to its width at said pole tip at a single flare point.
6. The yoke described in claim 1 wherein its width at said constricted region reduces to its width at said pole tip through a succession of flare points.
7. The yoke described in claim 1 wherein there is an increase in write field width, out to 6 kOe, of less than 0.016 microns for a write current increase from 40 to 60 mA.
8. A method to reduce magnetic write head sensitivity to write current, comprising:
    providing a magnetic yoke, having a first width, that terminates at a pole tip, having a second width;
    inserting, between said yoke and said pole tip, a constricted region, having a width intermediate between said first and second widths, thereby controlling flux supplied to said pole tip region, and thus suppressing readback pulse width broadening, nonlinear transition shifting, media noise increases, and adjacent track erasure; and
    making the ratio of said constricted region's width to said pole tip's width to be between 8 and 20 whereby there is a write field increase of less than 0.4 kOe for a write current increase from 40 to 60 mA.

9. The method described in claim 8 wherein said first width is between about 6 and 13 microns.

10. The method described in claim 8 wherein said second width is between about 0.15 and 3 microns.

11. The method described in claim 8 wherein said constricted region is between about 2 and 6 microns long.

12. The method described in claim 8 wherein its width at said constricted region reduces to its width at said pole tip at a single flare point.

13. The method described in claim 8 wherein its width at said constricted region reduces to its width at said pole tip through a succession of flare points.

14. The method described in claim 8 wherein there is an increase in write field width, out to 6 kOe, of less than 0.016 microns for a write current increase from 40 to 60 mA.

* * * * *